UNITED STATES PATENT OFFICE.

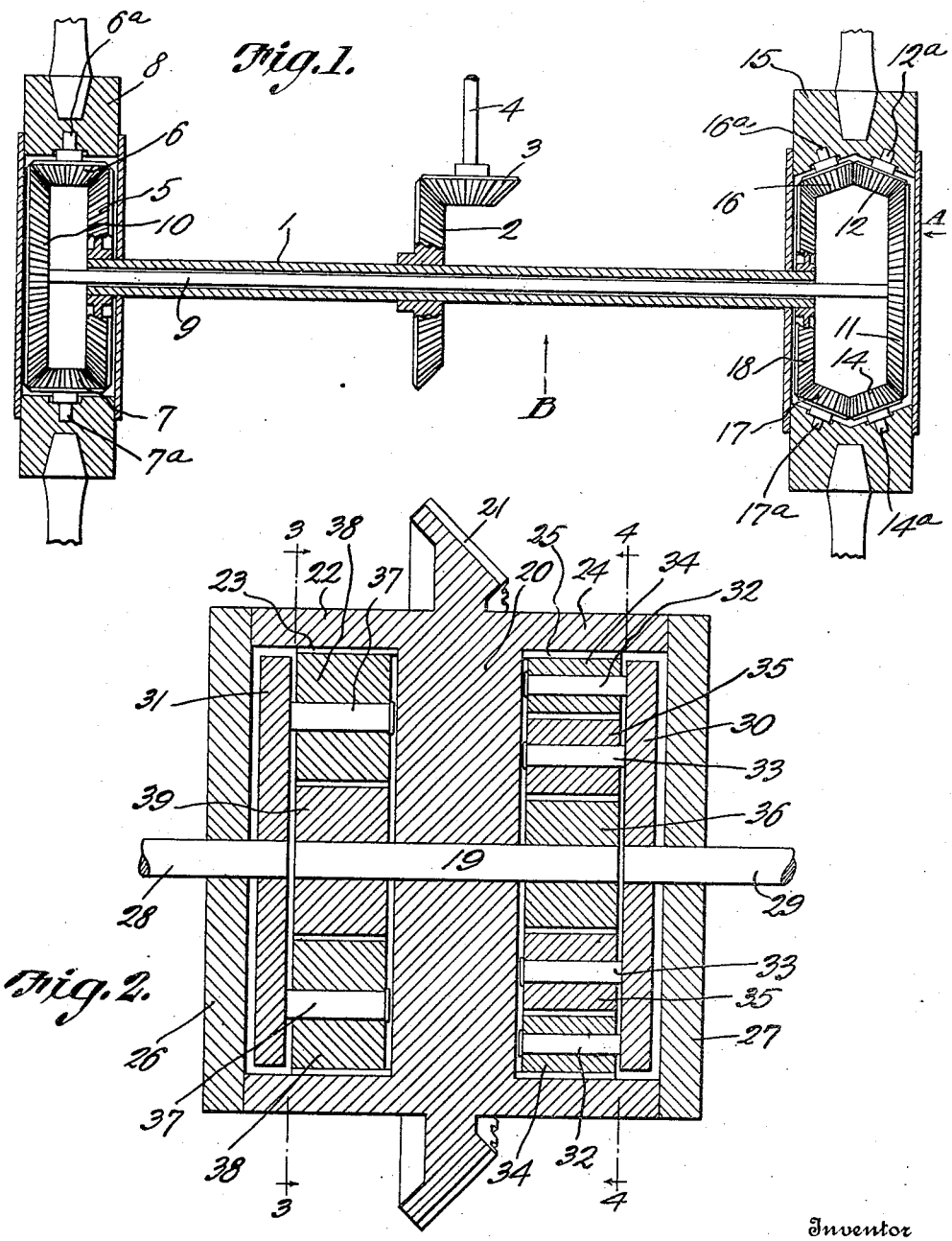

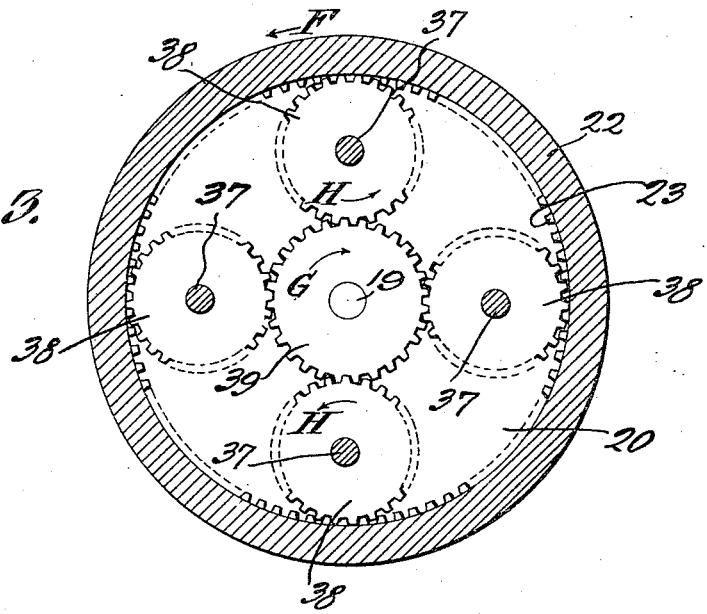
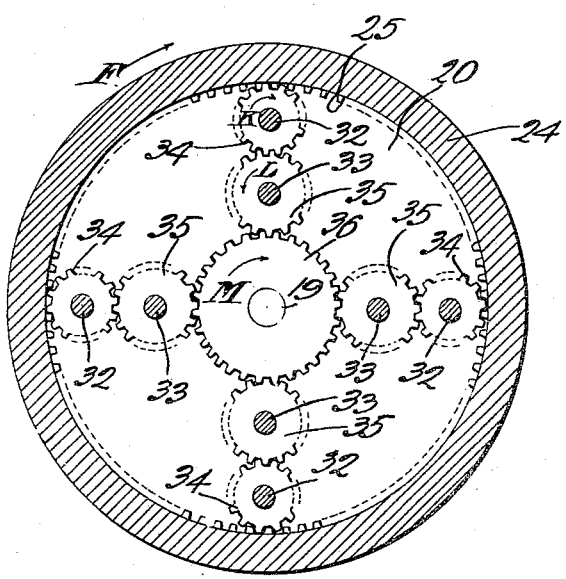

WILLIAM ROY PILLMORE, OF WESTERNVILLE, NEW YORK.

DRIVE-DIFFERENTIAL FOR MOTOR-CARS.

1,246,155. Specification of Letters Patent. Patented Nov. 13, 1917.

Application filed May 24, 1917. Serial No. 170,710.

*To all whom it may concern:*

Be it known that I, WILLIAM ROY PILLMORE, a citizen of the United States, residing at Westernville, in the county of Oneida and State of New York, have invented a new and useful Drive-Differential for Motor-Cars, of which the following is a specification.

The device forming the subject matter of this application is a differential drive for motor propelled vehicles, and one object of the invention is to provide novel means whereby a drive may be imparted to the wheels of the vehicle directly from the stub shafts of the idle pinions, novel means being provided whereby both ground wheels may be driven positively at the same speed, and whereby one ground wheel may rotate faster than the other when, for instance, the vehicle turns a corner.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in top plan, a differential mechanism embodying one part of the invention, parts being broken away;

Fig. 2 is a horizontal section showing a modified form of the invention;

Fig. 3 is a section on the line 3—3 of Fig. 2;

Fig. 4 is a section on the line 4—4 of Fig. 2.

In the drawings there is shown a rotatable hollow shaft 1 which may be driven in any suitable manner, as by means of a beveled gear wheel 2 fixed to the shaft 1, a beveled pinion 3 meshing into the gear wheel 2, and a driving shaft 4 whereon the pinion 3 is mounted.

A beveled gear wheel 5 is fixed to one end of the hollow shaft 1 and meshes into a beveled pinion 6 carried for rotation on a stub shaft 6ª fixed in one ground wheel 8. The ground wheel 8 carries a fixed stub shaft 7ª on which is journaled a pinion 7 disposed opposite to the pinion 6 and meshing into the gear wheel 5.

Journaled for rotation in the hollow shaft 1 and ordinarily adapted to rotate at the same speed as the shaft 1 is an inner shaft 9 to one end of which is fixed a beveled gear 10. The beveled pinions 6 and 7 mesh into the beveled gear wheel 10. Fixed to the other end of the shaft 9 is beveled gear wheel 11 meshing into beveled pinions 12 and 14. The pinions 12 and 14 are journaled, respectively, on stub shafts 12ª and 14ª fixed in a wheel 15. The beveled pinion 12 meshes into a beveled pinion 16, and the beveled pinion 14 meshes into a beveled pinion 17. The pinion 16 is journaled on a fixed stub shaft 16ª carried by the wheel 15 and the beveled pinion 17 is journaled on a fixed stub shaft 17ª carried by the wheel 15. The pinions 17 and 16 mesh into a gear wheel 18 fixed to the hollow shaft 1 at one end thereof.

In order to avoid confusion in the use of the terms "clockwise" and "counter-clockwise", let it be assumed that the observer views the gear wheels 11, 18, 5 and 10 in the direction of the arrow A in Fig. 1, and that he views the gear wheels 6, 7, 17, 14, 12 and 16 in the direction of the arrow B in Fig. 1.

Then, if a clockwise rotation is imparted to the shaft 1, a clockwise rotation will be imparted to the gear wheels 5 and 18. The gear wheel 5, moving clockwise, tends to rotate the pinion 6 clockwise, and to rotate the pinion 7 counter-clockwise. The pinions 6 and 7 tend to rotate the gear wheel 10 counter-clockwise but, as hereinafter explained, the gear wheel 10 and the shaft 9 cannot rotate counter-clockwise during this operation. Therefore, the wheel 8 receives a positive clockwise rotation from the fixed shafts 6ª and 7ª of the pinions 6 and 7 respectively.

When the gear wheel 18 is rotated clockwise as aforesaid, the pinion 16 tends to rotate counter-clockwise, and the pinion 12 tends to rotate clockwise. The pinion 17 tends to rotate clockwise and the pinion 14 tends to rotate counter-clockwise. The pinions 14 and 12 tend to rotate the gear wheel 11 and the shaft 9 clockwise—but the gear wheel 11 and the shaft 9 will not rotate clockwise, because the pinions 6 and 7 tend to rotate the gear wheel 10 and the shaft 9 counter-clockwise, as hereinbefore set forth. Therefore, when the gear wheel 18 is rotated clockwise, a clockwise rotation will be imparted to the wheel 15 from the fixed shafts 15ª, 16ª, 17ª and 14ª of the pinions 15, 16, 17, and 14, respectively.

From the foregoing it will be observed that the structure forming the subject matter of this application provides a means whereby a positive forward rotation at a common speed may be imparted to the wheels 8 and 15.

In rounding a corner, let it be supposed that the wheel 15 runs, in a clockwise direction, faster than the wheel 8 and faster than the gear wheel 18. Then, the gear wheel 18 will rotate the pinion 16 clockwise, the pinion 16 will rotate the pinion 12 counter-clockwise, and the pinion 12 will rotate the gear wheel 11 counter-clockwise, the pinions 14 and 17 contributing toward this result. The shaft 9 and the gear wheel 10 will rotate counter-clockwise and the pinion 6 will rotate clockwise and ride on the gear wheel 5, the pinion 7 rotating counter-clockwise and riding on the gear wheel 5.

In carrying out the invention as shown in Figs. 2, 3 and 4, there is provided a disk 20 corresponding to the hollow shaft 1. Journaled in the disk 20 is a shaft 19, represented in Fig. 1 by the shaft 9. The disk 20 is driven by any suitable means such as a beveled gear 21, replacing the parts 2, 3 and 4 of Fig. 1. The disk 20 has a flange 22 carrying an internal gear 23 corresponding to the part 5 of Fig. 1. The disk 20 has a flange 24 provided with an internal gear 25 represented in Fig. 1 by the gear wheel 18. Bearings 26 and 27 are shown, an axle 28 being journaled in the bearing 26, and an axle 29 being journaled in the bearing 27. The numeral 31 denotes a disk secured to the shaft 28. A disk 30 is secured to the shaft 29. The disk 30 carries stub shafts 32 and 33. Pinions 34 are journaled on the stub shafts, the pinions 34 meshing into the internal gear 25. The pinions 34 take the place of the parts 16 of Fig. 1. The pinions 34 mesh into pinions 35 on the shafts 33, the pinions 35 being represented in Fig. 1 by the parts 12. The pinions 35 mesh into a gear 36 attached to the shaft 19, the gear 36 having the functions of the part 11 of Fig. 1. The disk 31 carries stub shafts 37. Journaled on the stub shafts are pinions 38 meshing into the gear 23, the pinions 38 being represented in Fig. 1 by the parts 6 and 7. The pinions 38 mesh into a gear wheel fixed to the shaft 19 and corresponding to the part 10 of Fig. 1.

The operation of the structure shown in Figs. 2, 3 and 4, does not differ materially from the operation of the device delineated in Fig. 1.

In practical operation, when the disk 20 is rotated in the direction of the arrow F, the internal gear 23 of course rotates in the same direction. The gear 23 tends to rotate the pinions 38 in the direction of the arrow H. The pinions 38 tend to rotate the gear wheel 39 in the direction of the arrow G, but, as hereinafter explained, the gear wheel 39 cannot rotate in the direction of the arrow G during the operation above mentioned. Therefore, a positive rotation is imparted to the disk 31 and the axle 28.

When the disk 20 rotates in the direction of the arrow F, the pinion 34 tends to rotate in the direction of the arrow K, the pinion 35 tends to rotate in the direction of the arrow L, and the gear wheel 36 tends to rotate in the direction of arrow M, but the gear wheel 36 and the shaft 19 can not rotate in the direction of the arrow M, because the gear wheel 39 tends to rotate in the direction of the arrow G, as hereinbefore explained. A positive rotation is, therefore, imparted to the disk 30 and the axle 29.

Having thus described the invention, what is claimed is:—

A differential embodying an outer driven member and gears rotatable therewith; a shaft journaled in the outer driven member; gear wheels fixed to the shaft; a pinion meshing into one gear and into one gear wheel; pinions meshing into each other and meshing respectively into the other gear and into the other gear wheel; and means for connecting the first specified pinion and the last specified pinions with the respective wheels to be driven.

In testimony that I claim the foregoing as my own, I have hereto affixed my signature in the presence of two witnesses.

WILLIAM ROY PILLMORE.

Witnesses:
  Wm. F. Pillmore,
  William H. Jones.

Copies of this patent may be obtained for five cents each, by addressing the "Commissioner of Patents, Washington, D. C."